United States Patent [19]

Hagerty

[11] Patent Number: 4,666,998

[45] Date of Patent: May 19, 1987

[54] CLOSED LOOP RECYCLE OF VENT GAS IN POLYMERIZATION PROCESS

[75] Inventor: Robert O. Hagerty, Edison, N.J.

[73] Assignee: Mobil Oil Corporation, New York, N.Y.

[21] Appl. No.: 862,163

[22] Filed: May 9, 1986

Related U.S. Application Data

[63] Continuation of Ser. No. 687,878, Dec. 31, 1984, abandoned.

[51] Int. Cl.$^4$ ............................................. C08F 2/34
[52] U.S. Cl. ....................................... 526/68; 526/70
[58] Field of Search ............................................ 526/68

[56] References Cited

U.S. PATENT DOCUMENTS

| | | | |
|---|---|---|---|
| 3,256,263 | 6/1966 | Wisseroth et al. | 526/68 |
| 3,488,339 | 1/1970 | Carter | 528/483 X |
| 3,595,840 | 7/1971 | Moberly et al. | 526/68 |
| 4,340,701 | 7/1982 | Willmore et al. | 526/68 |
| 4,372,758 | 2/1983 | Bobst et al. | 526/88 X |
| 4,469,855 | 9/1984 | Cooper | 526/68 X |
| 4,481,301 | 11/1984 | Nowlin et al. | 502/104 |

FOREIGN PATENT DOCUMENTS

| | | | |
|---|---|---|---|
| 0089691 | 3/1983 | European Pat. Off. | |
| 0100550 | 2/1984 | European Pat. Off. | 528/483 |
| 1226659 | 3/1971 | United Kingdom | 526/68 |

*Primary Examiner*—Paul R. Michl
*Attorney, Agent, or Firm*—Alexander J. McKillop; Michael G. Gilman; Stanislaus Aksman

[57] ABSTRACT

A fluidized bed olefin polymerization process incorporates a recycle of a vent gas, containing unreacted monomers, from the product purge bin vessel to the polymerization reactor. The recycle of the vent gas minimizes the loss of the unpolymerized reactants, thereby decreasing overall process and product costs.

16 Claims, 2 Drawing Figures

CLOSED LOOP RECYCLE OF VENT GAS IN POLYMERIZATION PROCESS

This is a continuation of copending application Ser. No. 687,878, filed on Dec. 31, 1984, now abandoned.

BACKGROUND OF THE INVENTION

1. Field of the Invention

This invention relates to a method for polymerizing alpha-olefins. More particularly, the invention relates to an improved method of polymerizing alpha-olefins to produce, preferably, linear low density polyethylene and polypropylene, wherein the loss of monomers experienced in prior art processes is greatly reduced.

2. Description of the Prior Art

Polymers and copolymers of $C_2$-$C_{10}$ olefins, particularly copolymers of ethylene and higher alpha-olefins, have in recent years been produced in gas phase, fluid bed reactors. Karol et al, U.S. Pat. No. 4,302,566, describe a gas phase, fluid bed reactor for producing linear low density polyethylene polymers. Graff, U.S. Pat. No. 4,173,547, Stevens et al, U.S. Pat. No. 3,787,384, Strobel et al, U.S. Pat. No. 4,148,754 and Ziegler, deceased, et al, U.S. Pat. No. 4,063,009, describe various polymerization processes which produce polyethylene other than linear low density polyethylene.

Nowlin et al, U.S. Pat. No. 4,481,301, the entire contents of which are incorporated herein by reference, teach the preparation of a highly active alpha-olefin polymerization catalyst comprising contacting a support material, e.g., silica, containing reactive OH groups with a stoichiometric excess of an organomagnesium composition, and subsequently reacting the product with a tetravalent titanium compound.

Bobst et al, U.S. Pat. No. 4,372,758, disclose a process for removing unpolymerized monomers from olefin polymers, comprising introducing an inert gas into a purge vessel countercurrently to the flow of the product also introduced into the purge vessel. The unreacted hydrocarbon monomers are stripped from the product in the purge vessel, a vent gas containing the monomers is recovered from the purge vessel, a portion of the vent gas is burned in a flare, and the remainder thereof is recycled to the purge vessel as a conveying stream for the polymer or as a purge stream.

As is known to those skilled in the art, heretofore-known gas phase, fluid bed reactor processes for polymerizing alpha-olefins, and especially processes producing linear low density polyethylene polymers, were relatively inefficient because a substantial portion of monomers was not converted to the products and represented lost reactants. There were two principal mechanisms responsible for the loss of alpha-olefins in such a process: (A) reactor gas vented with the polymer in the product discharge system, and (B) unreacted alpha-olefin reactant gas dissolved in the product and carried with it from the reactor downstream into the system. Reactor gases lost by both of these mechanisms were usually removed from the system through a purge bin flare vent. Unreacted monomers usually comprised about 2–8% of the total monomers fed to the reactor.

In previously used gas phase, fluid bed reactor processes, the monomer or monomers were conducted to a fluid bed reactor, normally operating at the pressure of about 300 psig. Simultaneously, but independently of the monomers feed, an olefin polymerization catalyst was also conducted into the fluid bed reactor. The partial pressure of the ethylene monomer in such a gas phase fluid bed reactor was required to be at least 100 psi. At such a relatively high ethylene partial pressure, the losses of the ethylene and hexene, when hexene was used as the comonomer, were substantial as is exemplified in Table 1 below.

TABLE 1

| Commercial Ziegler-Natta Ethylene Polymerization Catalyst, 100 psi $C_2=$ Partial Pressure (lbs. loss/lb. of product) | | |
|---|---|---|
|  | Ethylene | Hexene |
| Discharge System Vent Loss | 0.0082 | 0.0043 |
| Dissolved Loss | 0.0024 | 0.0408 |
| Total Loss | 0.0106 | 0.0451 |

As shown in Table 1, the hexene comonomer dissolved in the product represents the largest loss from the process. Vent losses are smaller but are also significant. Assuming the raw materials cost to be 24 cents/pound of ethylene and 40 cents/pound of hexene, the total cost for unreacted monomers lost is estimated to be about 2.1 cents per pound of the product.

With the recently-developed alpha-olefin polymerization catalysts, the partial pressure of olefin monomer, such as ethylene, in the reactor is usually maintained at about 20 to about 80 psi. Since the preferred minimum operating pressure in the gas phase, fluid bed. reactor of this type is about 300 psig, an inert gas, such as nitrogen, had to be added to the reactor to compensate for the lower ethylene partial pressure. The polymerized product was discharged from the reactor and conducted to a product discharge system, typically comprised of two vessels in series, and then conveyed to a product purge vessel for removal of unreacted hydrocarbons. In the product purge vessel, the unreacted hydrocarbon reactants were removed by passing the product countercurrently to the flow of an inert purge gas, such as nitrogen, and recovering a vent gas containing the unreacted reactants. The vent gas was normally burned in a flare unit.

With such new-generation alpha-olefin polymerization catalysts, which enable the operation of the fluidized bed reactor at partial pressures of ethylene of about 20–80 psi, the reactant gas losses are reduced, as shown below in Table 2.

TABLE 2

| Reactant Gas Losses at Low $C_2=$ Partial Pressure (lbs. loss/lb. of product) | | |
|---|---|---|
|  | Ethylene | Hexene |
| Process operating at 60 psi $C_2=$ | 0.0064 | 0.0261 |
| Process operating at 25 psi $C_2=$ | 0.0027 | 0.0080 |

Based on the above data, potential raw material savings are 0.86 cents/pound for the process operating at 60 psi partial pressure of ethylene and 1.68 cents/pound for a process operating at 25 psi partial pressure of ethylene, as compared to the process of Table 1.

Although the advent of gas phase, fluid bed reactor processes for polymerization of alpha-olefins, such as that described by Nowlin et al, decreased the losses of the unreacted monomers because lower partial pressures of the reactants are sufficient in the fluidized bed reactor, such losses are still considerable and add substantially to the cost of the polymer products produced in the process.

Accordingly, it is a primary object of the present invention to provide an improved gas phase, fluid bed reactor process for polymerizing alpha-olefins, particularly a process which produces linear low density polyethylene and copolymers of ethylene with higher monomers, wherein the losses of the unreacted monomers are decreased.

Additional objects of the present invention will become apparent to those skilled in the art from the following description of the invention and the appended claims.

SUMMARY OF THE INVENTION

A fluidized bed, gas phase process for polymerizing $C_2$–$C_{10}$ alpha-olefins, wherein an inert gas is used to remove unreacted alpha-olefin reactants from the product, is improved by eliminating a stream of nitrogen make-up feed to the gas phase fluid bed reactor, and by substituting therefor a recycle stream from the product purge vessel. The recycle stream is obtained from the vent gas which is recovered from the product purge vessel, also referred to herein as the purge vessel. The recycle stream is conducted from the purge vessel to a compressor and subsequently recycled to the fluid bed vessel.

In an alternative embodiment, a portion of the purge vessel vent gas is conducted to one of the two tanks of the product recovery system to serve as a boost flow gas for helping convey the polymer product to the purge vessel.

DETAILED DESCRIPTION OF THE INVENTION

The present invention can be used in conjunction with a process for polymerization or copolymerization of any $C_2$–$C_{10}$ alpha-olefins. However, in the preferred embodiments, the invention is directed to the polymerization of ethylene, or copolymerization of ethylene with higher $C_3$–$C_{10}$ alpha-olefins, and the polymerization of propylene. Although, for purposes of illustration and simplification, the invention will be described below with reference to the production of low pressure, low density ethylene copolymers prepared by polymerizing ethylene and 1-hexene, it will be apparent to those skilled in the art that the process of the present invention is not limited thereto, and that it can be used in all of the olefin polymerization reactions identified above.

As used herein, and in the appended claims, the term "low pressure, low density ethylene copolymers" is used to designate copolymers containing at least about 80% by weight of ethylene units and not more than about 20% by weight of at least one $C_3$–$C_{10}$, preferably $C_3$–$C_8$, alpha-olefin hydrocarbon comonomer, such as propylene, 1-butene, 1-hexene, 4-methyl 1-pentene and 1-octene, which are copolymerized at relatively low total reactor pressures of about 100–350 psig and at relatively low monomer partial pressures of about 25–150 psia. Such copolymers have the density of not greater than about 0.94 g/cc, and preferably their density is in the range of about 0.91 to about 0.94 g/cc.

Figure 1:
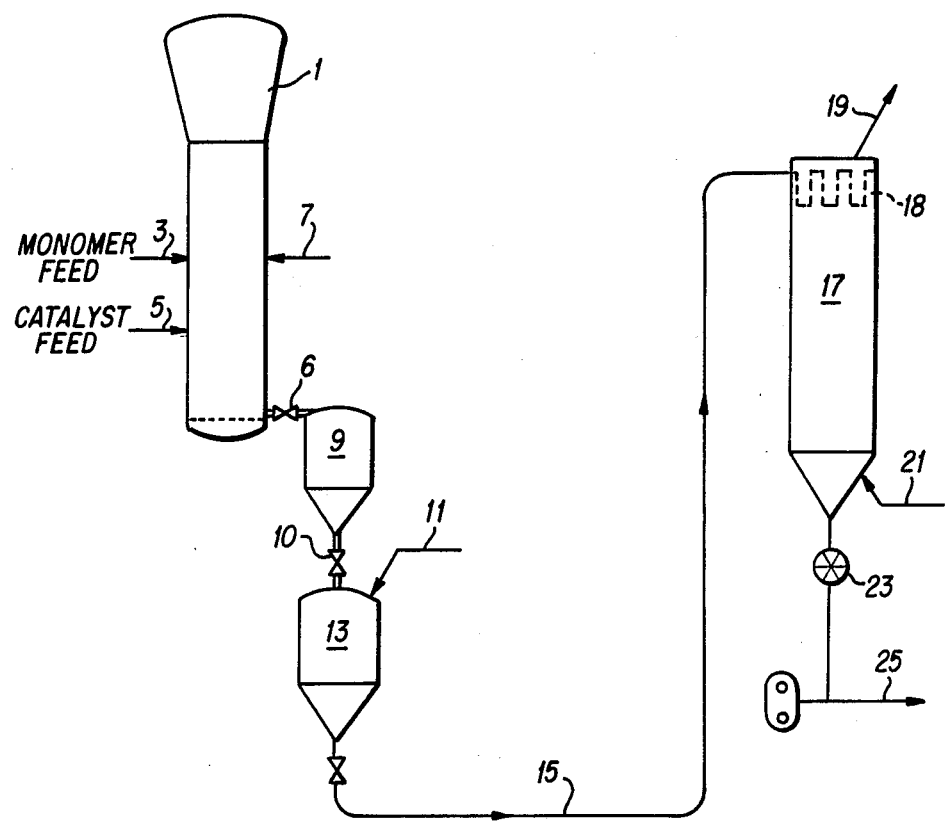
FIG. 1 is a schematic flow chart of a prior art process for low pressure, gas phase, fluid bed, alpha-olefin polymerization reaction.
Figure 2:
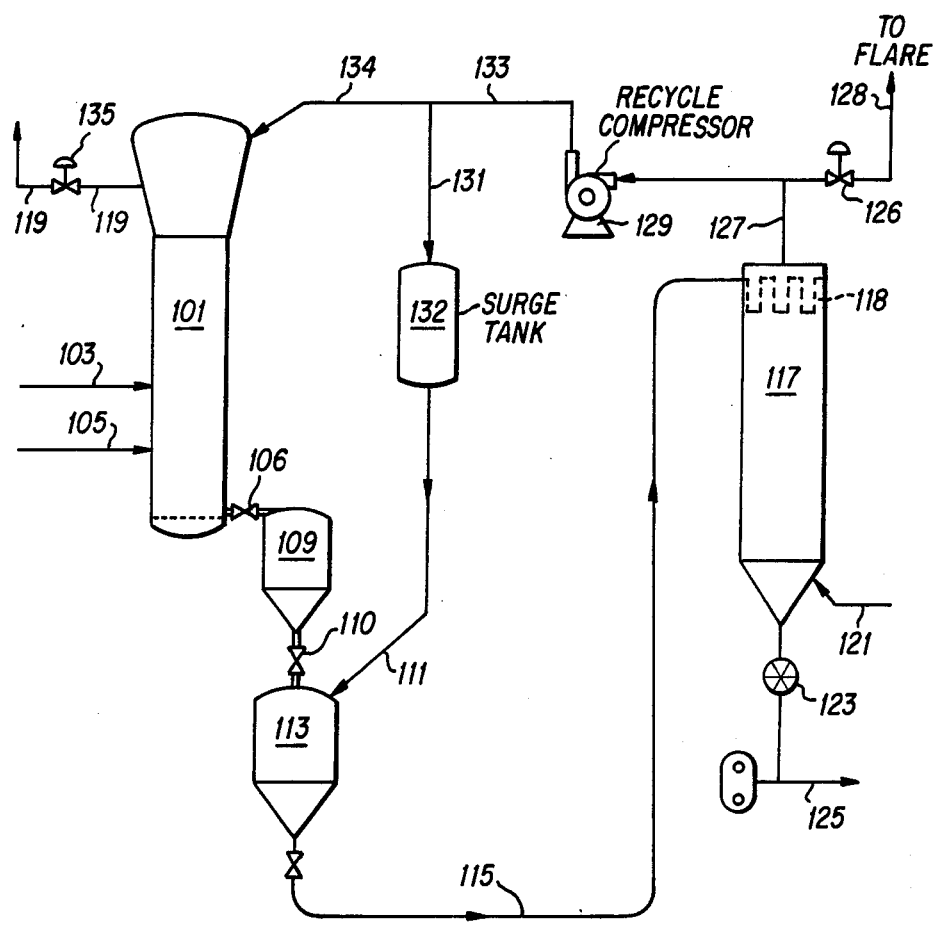
FIG. 2 is a schematic flow chart of a process for low pressure, gas phase, fluid bed alpha-olefin polymerization reaction of the present invention.

The crucial features of the invention can best be described by contrasting the operation of a prior art gas phase, fluidized bed polymerization process of FIG. 1 with the present invention, schematically illustrated in FIG. 2.

FIG. 1 is a schematic representation of a typical prior art fluidized bed polymerization process for polymerizing linear low density polyethylene from ethylene and 1-hexene wherein nitrogen is used as a purge gas in a purge vessel means, and the vent gas recovered from the purge vessel means is burned in a flare. With reference to FIG. 1, a fluid bed reactor 1 is operated at about 300 psig total pressure. Monomer feed is introduced into the reactor through a conduit 3 and a particulate catalyst feed through a conduit 5. Typical monomer feed is comprised of ethylene and 1-hexene, both of which may be introduced through the conduit 3, or, alternatively, ethylene could be introduced into the reactor through a conduit 3 and 1-hexene through a separate conduit, not shown in FIG. 1. Nitrogen make-up feed is introduced into the reactor through a conduit 7 to control the ethylene partial pressure within the reactor. At a constant total reactor pressure, a high rate of nitrogen feed increases the nitrogen partial pressure in the reactor and lowers the ethylene partial pressure.

After the monomers are copolymerized in the reactor, the polymer product is withdrawn from the fluid bed reactor and conducted to a two-vessel product discharge system comprised of a product chamber 9 and a product blow tank 13, arranged in series. As shown in FIG. 1, the product is first conducted from the reactor 1 into the product chamber 9 through a product valve 6. The product chamber is thereafter sealed from the reactor by closing product valve 6. The product is conducted to a product blow tank 13 through a valved conduit 10. A stream of nitrogen is introduced into the product blow tank 13 through a conduit 11 to aid in conveying the product from the product discharge system into the purge bin. Thus, the product is conveyed through a line 15 to the product purge bin 17 containing conventional filters 18 in the upstream portion thereof. A stream of an inert purge gas, such as nitrogen, is introduced into the downstream portion of the purge bin through a conduit 21 to remove any unpolymerized monomers from the product and from the system. Such unpolymerized monomers, in the stream of the inert gas, are removed from the purge bin through a conduit 19 and conducted to a flare to be burned. The product polymer is removed from the purge bin through a conventional airlock device 23 and then conducted to conventional storage facilities through a conduit 25. When the process of FIG. 1 is used to polymerize ethylene with 1-hexene to produce a copolymer having the density of 0.918 g/cc, a substantial amount of 1-hexene, highly soluble in such a low density polyethylene, is removed from this system through the conduit 19 and burned, and it therefore represents "wasted" monomer, as discussed above.

In accordance with the present invention, described in detail below, the vent gas from the purge bin vessel, instead of being conducted to a flare and burned, is recirculated to the fluidized gas phase reactor, thereby providing a substitute for the inert gas fed into the reactor in prior art systems to maintain the monomer concentration, such as ethylene, at the required level. In addition, the vent gas recirculated to the fluidized gas phase reactor also contains a significant amount of reactant gases which are polymerized in the presence of the catalyst.

For purposes of illustration, the invention will be described in conjunction with one exemplary embodiment thereof, schematically illustrated in FIG. 2. In reference to FIG. 2, the process is conducted in substantially the same manner as that of FIG. 1, described in detail above, except for the modifications imparted thereto by the present invention. The description of the exemplary embodiment of the process illustrated in FIG. 2 is based on the following assumptions: a low pressure polymerization of ethylene and 1-hexene is conducted to produce a copolymer having a density of 0.918 g/cc, and a melt index of 2 g/10 min.; the catalyst of Nowlin et al is used with triethylaluminum as a co-catalyst; and nitrogen is used as an inert purge gas in the purge bin. Ethylene alone, or together with 1-hexene, is introduced into fluid bed reactor 101 through a conduit 103. The polymerization catalyst is introduced into the reactor 101 through a conduit 105. The reactor 101 is operated at a total reactor pressure of about 300 psig, the temperature of about 88° C. and at a fluidization gas speed of about 2 ft./sec. The polymerized product is removed from the reactor and conducted to a two-tank product discharge system comprised of the product chamber 109 and the product blow tank 113. Subsequently, the product is conducted to a purge bin vessel 117, and recovered therefrom through an air-lock device 123 and a conduit 125. An inert purge gas, such as nitrogen ($N_2$), is introduced into the purge bin vessel at the rate of about 0.02 pounds of $N_2$ per pound of polymer, through a conduit 121 to remove any unreacted monomers. In contrast to the prior art process, described above in connection with FIG. 1, the vent gas from the purge bin, having a pressure of about 1 to 2 psig, is removed through a conduit 127, conducted to a compressor 129, wherein it is compressed to a pressure of about 350 to about 450 psig, and returned to the reactor. After leaving the recycle compressor, the gas is conducted through a conduit 133 to the reactor 101. The reactor 101 is equipped with a vent gas conduit 119, containing a valve 135 which conducts excess gases to a flare, wherein they are burned.

In an optional embodiment, the process of FIG. 2 can be equipped with an auxiliary vent system comprising a control valve 126 and an auxiliary vent gas conduit 128. If desired, all or a portion of the purge bin vent gas from the conduit 127 can be passed through the auxiliary vent system and the remainder, if any, to the recycle compressor 129. The auxiliary vent system provides operational flexibility to accommodate reactor start-up or other situations wherein the full recycle of the purge bin vent gas to the reactor is undesirable.

In the preferred embodiment, the valve 126 is closed and only a portion of the purge bin gas vent, recovered through a conduit 127, is recycled to the reactor, while the remainder thereof is used as a boost flow stream to help in conducting the product from the product blow tank to the purge bin vent vessel. In this embodiment, 20% to 80% by volume, preferably 30% to 50% by volume of the total gas stream removed from the purge bin through the conduit 127 is conducted through a conduit 134 to the reactor 101, while the remainder of the gas, that is, 20% to 80% by volume, preferably 50% to 70% by volume, is conducted to a surge tank 132 through a conduit 131, and is subsequently used as a boost flow gas introduced into the product blow tank means 113 through a conduit 111.

In another alternative embodiment, not shown in FIG. 2, a condenser may be incorporated into the process downstream of the recycle compressor. For example, the condenser may be incorporated in conduits 131, 133 or 134, or in the vent conduit 119, between the reactor 101 and the control valve 135. The condenser would preferentially condense heavy hydrocarbons, such as 1-hexene, from the gas stream. The condensed hydrocarbons would then be recycled to the reactor. If the condenser is placed in the conduits 131, 133 or 134, the lighter, uncondensed components would be partially used as the recycle gas introduced into the reactor to eliminate the nitrogen make-up feed of prior art, and partially conducted to a separate vent system, also not shown in FIG. 2, to replace, at least to some extent, the flow through the vent conduit 119. If the condenser is incorporated into the conduit 119, all of the lighter, uncondensed components would be conducted to the existing vent system, shown in FIG. 2, e.g., through the control valve 135. In such an alternative embodiment, the overall recovery of heavy hydrocarbons, such as 1-hexene, is improved.

By eliminating the nitrogen boost flow, necessary in the prior art processes (see FIG. 1), the nitrogen concentration in the purge bin vent gas (removed through the conduit 127 in FIG. 2) is reduced and the reactant gas concentration is increased. Thus, for a given rate of inert gas recycle, required to maintain the desired level of ethylene partial pressure in the fluid gas phase reactor, higher reactant gas concentration in the recycle allows a greater amount of recovery of reactant gases to the reactor.

An outlet from the reaction system to the flare is required to control the concentration of the inert material in the process. Thus, the process of the present invention (e.g., FIG. 2) is provided with a reactor vent conduit 119 to satisfy that requirement. At steady state conditions, the total rate of flow of inert ingredients in the vent gas must equal the total rate of inert ingredients introduced into the system. Although the vent flow may be taken from any point in the system, it is preferably taken from the point of maximum concentration of inert materials (and thus minimum concentration of reactant gases) in the system. The point of maximum concentration of inert materials occurs in the reactor, and therefore, in the preferred embodiment (illustrated in FIG. 2) the reactor 101 is provided with a vent conduit 119 and a control valve 135. As used herein, and in the appended claims, the term "inert materials" designates all materials present in the process of the invention which do not undergo chemical reaction under the conditions of polymerization existing in the reactor 101. Such materials include, for the process of polymerizing ethylene and 1-hexene, nitrogen, ethane, hexane, and isopentane. Conversely, the term "reactant materials", as used herein and in the appended claims, designates materials which undergo chemical reaction or play a part in the reaction under the polymerization conditions of the reactor 101. Such materials include ethylene, 1-hexene, any other olefins which may be present in the system and hydrogen. Reactant materials also include catalyst modifiers and activators, such as triethylaluminum, triisobutylaluminum and oxygen.

The gas withdrawn through a vent conduit 119, subsequently conducted to a flare and burned, comprises about 7 to about 45%, preferably about 10 to about 35%, and most preferably about 16 to about 25% by volume of ethylene, about 0.3 to about 6%, preferably about 1 to about 5%, and most preferably about 1 to about 3.5% by volume of 1-hexene, with the remainder being hydrogen and inert gases.

The vent gas, withdrawn from the purge bin vessel through the conduit 127 comprises about 50 to about 65% by volume of the inert materials, and about 35 to about 50% by volume of the reactants. In contrast, in prior art processes, such as that illustrated in FIG. 1, the purge bin vent gas (removed through the conduit 19 in FIG. 1 and burned in a flare) comprised about 70–80% by volume of the inert materials and about 20 to about 30% by volume of the reactants when the process of prior art illustrated in FIG. 1 was used for producing identical copolymers of ethylene and 1-hexene as those produced in the process of FIG. 2. For the process illustrated in FIG. 2, calculated raw material losses are summarized in Table 3.

TABLE 3

| Reactant Gas Losses with Vent Recycle (lbs. loss/lb. of product) | | |
|---|---|---|
|  | Ethylene | Hexene |
| Process operating at 60 psi $C_2^=$ | 0.0066 | 0.0032 |
| Process operating at 25 psi $C_2^=$ | 0.0011 | 0.0004 |

The savings in raw materials costs obtained by recycling the purge bin vent gases to the reactor can be seen by comparing the data of Tables 2 and 3. The net reduction in raw material losses, obtained from that comparison, is summarized in Table 4.

TABLE 4

| Loss Reduction with Vent Recycle (lbs. loss/lb. of product) | | |
|---|---|---|
|  | Ethylene | Hexene |
| Process operating at 60 psi $C_2^=$ | (−0.0002) | 0.0229 |
| Process operating at 25 psi $C_2^=$ | 0.0016 | 0.0076 |

The data in Table 4 shows that, assuming raw materials cost of 24 cents/pound of ethylene and 40 cents/pound of 1-hexene, the vent recycle system of the present invention represents cost savings of 0.91 cents/pound for a catalyst when the polymerization process is conducted at the ethylene partial pressure of 60 psi and 0.34 cents/pound for the catalyst when the process to operates at 25 psi partial pressure of ethylene.

It will be apparent to those skilled in the art that the vent recycle system of the present invention is most effective and economical when it is used in combination with high activity olefin polymerization catalysts enabling the process to be operated at low ethylene partial pressures of not greater than about 80 psi. Such catalysts are disclosed, for example, by Karol et al, U.S. Pat. No. 4,302,566, the entire contents of which are incorporated herein by reference. In the most preferred embodiment, the catalyst used herein, which enables the operation of the process at extremely low pressures of about 20–40 psi of ethylene partial pressures, is that described by Nowlin et al, U.S. Pat. No. 4,481,301.

Conventional materials handling equipment and techniques may be employed in the process of the present invention. It is preferred, however, to use a purge vessel which has a conical-shape bottom as shown schematically in FIG. 2. In this case, in order to obtain the preferred plug flow of resin, it may be necessary to utilize an inverted conical insert or other means inside the bottom of the purge vessel. The height of this insert may be adjusted in order to provide the desired effect. Such inserts are commercially available. The purpose of the filters (118 in FIG. 2) is to prevent the resin particles from being carried out of the top of the purge vessel with the exiting purge gas. Conventional, commercially-available bag filters may be employed. Similarly, conventional coolers and blowers may be employed to provide the necessary materials handling capability and to control the temperature and pressure of resin and purge gas.

The temperature of the resin in the purge vessel is not critical and is normally dependent upon the temperature at which it is obtained from the polymerization reaction. However, the resin temperature affects the residence times as discussed below. In the case of linear, low pressure, low density ethylene copolymers (LLDPE), the resin may be obtained in the form of solid particles directly from the polymerization reaction at a temperature of about 80°–90° C. It is economically desirable not to add additional heat to the resin before feeding the same to the purge vessel. It is also necessary to maintain the resin temperature lower than its softening or melting point which in the case of the LLDPE copolymers is about 100°–110° C. The higher the temperature in the purge vessel, the higher the rate of diffusion of the monomer gases from the solid polymer particles to the purge gas. However, economic considerations may prevent additional heat from being added to the resins. Satisfactory results can be obtained by directly feeding the resin at its reaction temperature to the purging operation, even considering the fact that its temperature may decrease or increase slightly due to the temperature of the conveying gas.

The inert purge gas is preferably fed to the bottom of the purge vessel at ambient temperature although any temperature up to about the temperature of the resin is acceptable. It is also preferred to provide a low positive pressure in the purge vessel since the rate of gaseous monomer diffusion is higher at lower pressures. It is however also preferred to maintain a positive pressure in the purge vessel and to avoid a vacuum since any vacuum may have the effect of drawing into the system air or oxygen which might create safety problems in view of the explosive nature of the hydrocarbon monomers at higher concentrations. Although the proper pressure depends on many factors, those skilled in the art are capable of making that determination using known mass transfer techniques. In the case of the LLDPE copolymers, the pressure of the purge gas fed to the bottom of the purge vessel is preferably about 1 psig, although it may be as high as 15 psig or greater.

It is preferable to provide as uniform a flow of purge gas through the purge vessel as possible. To achieve a uniform purge gas flow, it may be necessary to provide a plurality of uniformly-spaced openings or other flow distribution devices in the bottom of the purge vessel for feeding the purge gas. For purposes of the present invention, it is preferred to feed the purge gas into the purge vessel at a rate of at least about 1 linear foot per minute.

The rate of flow of resin through the purge vessel is not critical and depends upon the minimum residence time necessary to reduce the concentration of gaseous monomers in the resin to the desired level. It is preferred to reduce the hydrocarbon monomer gas content in the resin to below about 25–50 parts per million by weight, although the extent to which the hydrocarbon monomer concentration must be reduced depends upon both environmental and safety requirements. In any event, the purging process is effective to substantially reduce the hydrocarbon monomer gas content of the LLDPE copolymer resins.

The inert purge gas employed in the practice of the present invention may be any gas which is inert both to the resin being purged and the particular gaseous monomers being removed. The preferred purge gas is nitrogen, although other gases, such as helium, may be employed. In the preferred embodiment, the nitrogen content of the purge gas is at least about 90% and oxygen is substantially excluded from the purge gas. The maximum permissible oxygen content varies depending upon the particular hydrocarbon monomer gas being stripped. As the concentration of hydrocarbons increases in the presence of oxygen, the danger of explosion also increases, and this level varies with different hydrocarbons. Those skilled in the art can easily determine the tolerable oxygen levels for a particular monomer. Of course, the inert purge gas may also include small amounts of the gaseous monomers although as their concentration increases, their diffusion rate and hence the resin residence time will be affected as discussed above. Other advantages of employing relatively pure nitrogen as a purge gas are that more hydrocarbon gases can be stripped from the resin particles and any pure nitrogen that may be discharged with the exiting resins does not contribute to atmospheric emissions as would gases containing impurities.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. In a vapor phase, fluidized bed process for polymerizing at least one $C_2$ to $C_{10}$ alpha-olefin comprising: polymerizing the alpha-olefin in a fluidized bed reactor means having a stream of a substantially pure inert gas introduced thereinto to maintain the required operating pressure in the reactor means; recovering the polymerized alpha-olefin product from the fluidized bed reactor means into a product discharge system; conveying the product from the product discharge system to a purge vessel means wherein the product is contacted with a substantially pure inert purge gas to separate unreacted alpha-olefin from the product; and, removing a vent gas from the purge vessel means;
an improvement comprising:
(a) eliminating the introduction of the stream of a substantially pure inert gas into the fluidized bed reactor means;
(b) recycling the vent gas, without a concentration or purification treatment thereof, to the fluidized bed reactor means, the recycled vent gas comprising a significant amount of the unreacted alpha-olefin; and
(c) removing a reactor vent gas stream from the fluidized bed reactor means.

2. A process of claim 1 wherein the product discharge system comprises a product vessel means followed by a blow tank means, and wherein the product recovered from the fluidized bed reactor means is first conducted to the product vessel means and subsequently to the blow tank means.

3. A process of claim 1 wherein the vent gas recycled to the fluidized bed reactor means, after its removal from the purge vessel means, is separated into a first gas stream, conducted to the fluidized bed reactor means, and a second gas stream, conducted to the blow tank means, downstream of the fluidized bed reactor means.

4. A process of claim 3 wherein the first gas stream comprises 20% to 80% by volume of the vent gas removed from the purge vessel means.

5. A process of claim 3 wherein the pressure of the vent gas from the purge vessel means is increased to about 350 to about 450 psig, after the vent gas is removed from the purge vessel means.

6. A process of claim 5 wherein the inert purge gas is nitrogen or helium.

7. A process of claim 6 wherein the second gas stream is conducted to a surge tank means, upstream of its point of introduction into the blow tank means.

8. A process of claim 7 wherein a linear low density copolymer of ethylene with one or more $C_3$–$C_{10}$ alpha-olefins is produced.

9. A process of claim 8 wherein the $C_3$–$C_{10}$ alphaolefin is 1-hexene.

10. A process of claim 9 wherein the reactor vent gas removed from the fluidized bed reactor means comprises about 7% to 45% by volume of ethylene and about 0.3% to 6.0 % by volume of 1-hexene.

11. A process of claim 3 wherein a portion of the vent gas is removed from the process through an auxiliary vent system and the remainder thereof is separated into the first gas stream and the second gas stream.

12. A process of claim 4 wherein the first gas stream comprises 30% to 50% by volume of the vent gas removed from the purge vessel means.

13. In a vapor phase, fluidized bed process for polymerizing at least one $C_2$ to $C_{10}$ alpha-olefin comprising: polymerizing the alpha-olefin in a fluidized bed reactor means having a stream of a substantially pure inert gas introduced thereinto to maintain the required operating pressure in the reactor means; recovering the polymerized alpha-olefin product from the fluidized bed reactor means into a product discharge system; conveying the product from the product discharge system to a purge vessel means wherein the product is contacted with a substantially pure inert purge gas to separate unreacted alpha-olefin from the product; and, removing a vent gas from the purge vessel means;
an improvement comprising
(a) eliminating the introduction of the stream of a substantially pure inert gas into the fluidized bed reactor means;
(b) conducting the vent gas, comprising a significant amount of the unreacted alphs-olefin, to a condenser means to preferentially condense heavy hydrocarbons;
(c) recycling the thus-produced condensed heavy hydrocarbons and at least a portion of uncondensed components to the fluidized bed reactor means; and
(d) removing a reactor vent gas stream from the fluidized bed reactor means.

14. A process of claim 13 wherein the remainder of the uncondensed components is conducted to a vent gas means downstream of the purge vessel means.

15. A process of claim 14 wherein the condensed heavy hydrocarbons comprise 1-hexene.

16. A process of claim 1 wherein the product discharge system comprises a product vessel means followed by a blow tank means, and wherein the product recovered from the fluidized bed reactor means is first conducted to the product vessel means and subsequently to the blow tank means.

* * * * *